United States Patent
Zaitsev

(10) Patent No.: US 8,925,076 B2
(45) Date of Patent: Dec. 30, 2014

(54) APPLICATION-SPECIFIC RE-ADJUSTMENT OF COMPUTER SECURITY SETTINGS

(71) Applicant: Kaspersky Lab ZAO, Moscow (RU)

(72) Inventor: Oleg V. Zaitsev, Moscow (RU)

(73) Assignee: Kaspersky Lab ZAO, Moscow (RU)

( * ) Notice: Subject to any disclaimer, the term of this patent is extended or adjusted under 35 U.S.C. 154(b) by 53 days.

(21) Appl. No.: 13/711,195

(22) Filed: Dec. 11, 2012

(65) Prior Publication Data

US 2014/0165130 A1    Jun. 12, 2014

(51) Int. Cl.
*G06F 21/00* (2013.01)

(52) U.S. Cl.
CPC ..................................... *G06F 21/00* (2013.01)
USPC ........................................... 726/22; 713/166

(58) Field of Classification Search
CPC ....................................................... G06F 21/00
USPC ........................................... 713/166; 726/22
See application file for complete search history.

(56) References Cited

U.S. PATENT DOCUMENTS

| | | | |
|---|---|---|---|
| 7,197,550 B2 | 3/2007 | Cheline et al. | |
| 7,530,106 B1 | 5/2009 | Zaitsev et al. | |
| 7,707,632 B2 | 4/2010 | Nath et al. | |
| 7,865,965 B2 | 1/2011 | Kramer et al. | |
| 7,979,849 B2 | 7/2011 | Feldstein et al. | |
| 8,079,060 B1 | 12/2011 | Zaitsev | |
| 8,181,253 B1 | 5/2012 | Zaitsev et al. | |
| 8,239,944 B1 | 8/2012 | Nachenberg et al. | |
| 2004/0133777 A1* | 7/2004 | Kiriansky et al. | 713/166 |
| 2006/0230452 A1* | 10/2006 | Field | 726/22 |
| 2007/0016750 A1* | 1/2007 | Suzuki | 711/170 |
| 2007/0143824 A1* | 6/2007 | Shahbazi | 726/1 |
| 2007/0174915 A1* | 7/2007 | Gribble et al. | 726/24 |
| 2007/0192867 A1 | 8/2007 | Miliefsky et al. | |
| 2007/0209076 A1 | 9/2007 | Porter et al. | |
| 2008/0189788 A1 | 8/2008 | Bahl et al. | |
| 2008/0294985 A1* | 11/2008 | Milov | 715/704 |
| 2010/0011432 A1 | 1/2010 | Edery et al. | |
| 2010/0031308 A1 | 2/2010 | Khalid | |
| 2011/0314343 A1 | 12/2011 | Hoke et al. | |
| 2012/0173609 A1 | 7/2012 | Kulaga et al. | |

FOREIGN PATENT DOCUMENTS

RU       101233       1/2011

* cited by examiner

*Primary Examiner* — Techane Gergiso
*Assistant Examiner* — Thomas Ho
(74) *Attorney, Agent, or Firm* — Patterson Thuente Pedersen, P.A.

(57) ABSTRACT

System and method for re-adjustment of a security application to various application execution scenarios. Application execution scenarios for each of a set of software applications are created, each representing a specific subset of functionality of a corresponding application. Sets of security application configuration instructions are stored, each corresponding to at least one of the application execution scenarios. A current one or more of the application execution scenarios that is being executed in the computing device is determined and, in response, a set of security application configuration instructions corresponding to each current application execution scenario are carried out, such that the security application is adjusted to perform a specific subset of security functionality that is particularized to the current one or more of the application execution scenarios.

28 Claims, 5 Drawing Sheets

APPLICATION-SPECIFIC RE-ADJUSTMENT OF COMPUTER SECURITY SETTINGS

FIELD OF THE INVENTION

The invention relates generally to information processing and security and, more particularly, to rapid automatic re-adjustment of a security application to various application execution scenarios.

BACKGROUND OF THE INVENTION

To protect computer systems against the ever-growing number of security threats manufacturers of security tools for computer systems and networks are constantly developing and improving upon techniques for detection of malicious programs and their components. At the same time, advances in computing capacity are providing more opportunities for security functionality.

Computer users have many options at their disposal for configuring their security applications. However, this abundance of options presents its own set of challenges, namely, selecting the best options to provide a solid level of protection without unduly burdening their computing resources with excessive security functionality that provides little additional benefit.

Techniques for automatically configuring security applications are well-known. Some involve examining the type of computer resources that are available, and selecting the appropriate security functionality based on a previously defined knowledge base. Others take the additional step of looking at what applications are installed on a computer system, and adjusting the security functionality to provide an adequate level of protection based on the nature of the user's applications. Still others take into account such factors as the current computational load of the computer, location—in terms of exposure to risks on a network, and other factors relating to the present circumstances in which the computer operates.

These known techniques tend to adjust the security settings relatively slowly, since a device configuration tends to vary only from time-to-time. Likewise, computing capacity and environmental factors provide relatively coarse inputs that tend to require analysis and adjustment of the security settings to keep up, and this analysis takes up further resources.

To-date no practical solution has been proposed for fine-tuning security settings as applications are executing. Applying known methods would tend to either lack sufficient sensitivity and response time in the detection of the operating regime changes, resulting in either a lack of sensitivity to any changes, or an over- or under-correction, or require too much computing to determine the proper settings, thereby unduly burdening the computing resources in carrying out the security settings configuration process.

Accordingly, a solution is needed that avoids some of the drawbacks described above, and that is preferably capable of addressing other needs as well.

SUMMARY OF THE INVENTION

One aspect of the invention is directed to a method for rapid automatic re-adjustment of a security application to various application execution scenarios. According to embodiments of the invention, the method is applicable in a computing device comprising a plurality of computing resources including computing hardware and an operating system executing on the computing hardware, and a plurality of applications interfaced with the computing resources. In the method, a plurality of sets of security application configuration instructions is stored. Each set of security application configuration instructions corresponds to at least one of the application execution scenarios. The computing device determines a current one or more predefined application execution scenarios that is being executed in the computing device. In response, the computing device executes a set of security application configuration instructions corresponding to each current application execution scenario being executed, such that in response to the executing of the security application configuration instructions, the security application is adjusted to perform a specific subset of security functionality that is particularized to the current one or more of the application execution scenarios.

Another aspect of the invention is directed to a system for configuring a target computing device to automatically perform rapid automatic re-adjustment of a security application on a target computing device to various application execution scenarios. The system includes a set of at least one computing device (including the target computing device), each of which includes computing hardware and an operating system executing on the computing hardware. At least the target computing device further includes a plurality of applications interfaced with computing resources of the target computing device and a security application having configurable operational settings.

In the system an application execution scenario evaluation module is executable on the set of at least one computing device. The application execution scenario evaluation module is configured to define application execution scenarios for each of the plurality of applications, with each application execution scenario representing a specific subset of functionality of a corresponding application (the specific subset of functionality being defined by corresponding operational settings of that application that cause specific operations to be performed in the target computing device utilizing specific combinations of the computing resources of the target computing device).

Also as part of the system, a security settings generator module is executable on the set of at least one computing device and operatively coupled to the application execution scenario evaluation module. The security settings generator module is configured to generate a plurality of sets of security application configuration instructions, each of which corresponds to at least one of the application execution scenarios and adapted to adjust the security application to perform a specific subset of security functionality that is particularized to a current at least one application execution scenario being executed on the target computing device.

BRIEF DESCRIPTION OF THE DRAWINGS

The invention may be more completely understood in consideration of the following detailed description of various embodiments of the invention in connection with the accompanying drawings, in which.

Figure 1:
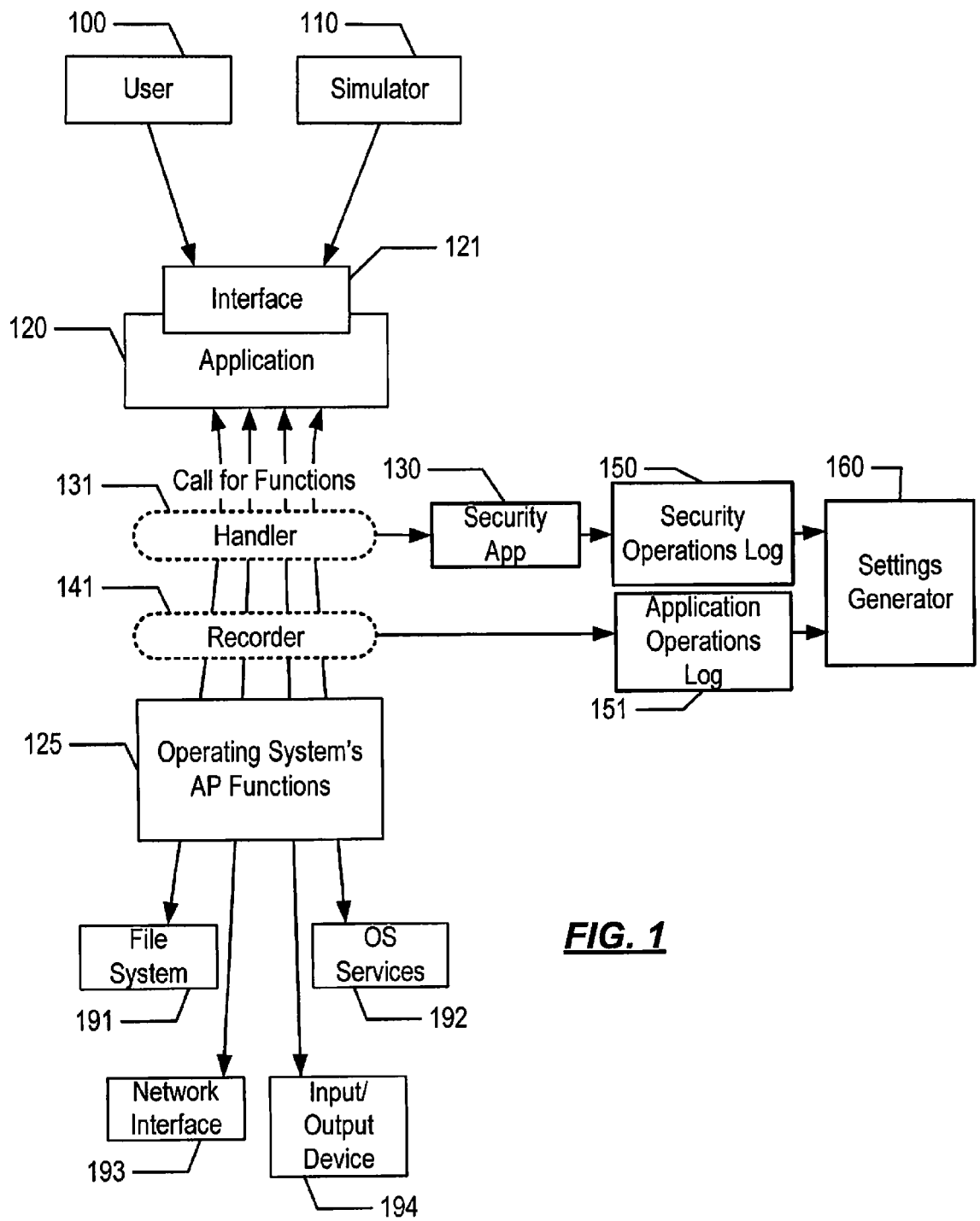
FIG. 1 is a block diagram illustrating a system for analysis of compatibility between an application and a security application according to one embodiment.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE PREFERRED EMBODIMENTS

In general, a computer program is a combined sequence of commands, designed to control computer system devices in order to perform a certain algorithm, and the data used during the execution of such commands. An application is a computer program designed for performing specific user tasks and intended for direct interaction with the user. Examples of applications are office programs designed for work with electronic documents, communicators, web browsers, computer games, and the like. In most operating systems, applications cannot access computer system resources directly; instead, they interact with the hardware and the system resources through the operating system.

To perform user tasks, each application uses various system resources, such as devices, files, system services, etc., which are accessed through Application Programming Interface (API) functions of the operating system or execution environment. Each application has many settings and functional capabilities, accessible to the user or administrator through some kind of interface.

There are many approaches to organizing interfaces. One such approach for organizing the interaction between the user and the computer is a text user interface. An example of such interface is a control console, used to input information and to specify commands. In this case, the information is also displayed in text or pseudo-graphical format. A text interface has all basic program control elements—menus, buttons, switches, flags, pull-down lists, scroll bars, etc.

The most widely used type of program interface is a graphical user interface (GUI), in which the application elements (menus, buttons, icons, lists) are presented as graphical images. Unlike a command line interface, the GUI gives users access to all visible screen objects and directly manipulates them. GUIs also have several implementation options. One technology which is quite popular among developers is the window interface technology, implemented within most operating systems, including Windows®, MacOS®, Linux®, and others. The implementation of such interfaces involves designing control elements (inclusion of standard forms or development of original elements) and in the processing of events caused by user actions and by the program operation logic. Another GUI implementation option, which is becoming increasingly popular, is a web interface, i.e. a set of control and display elements using browser capabilities. Typically, a web interface is used for work with remote services (for example, databases) as a client application, though this is not always the case. The implementation of web interfaces is often based on such technologies as JavaScript, HTML, CSS, Adobe Flash, Silverlight, Ajax and others.

Applications can also be controlled without using a user interface. This is done using administration tools, or by directly modifying the application's resources (files, registry keys, process, memory, etc.). In order to make changes to the application's operation, a certain command may be received, either a local one or a network one, or the application's files (for example, the configuration file) may be modified.

The execution of the application with a certain set of settings from the moment of sending a control signal to the application and until the moment of completion of the processing of the signal by the application will be referred to herein as the scenario of the application's execution. The application's functionality can be presented as a set of a limited number of scenarios. Such logical division of the application into functional blocks allows one to obtain a clearer idea of the capabilities and functions of the program when testing an unknown application. According to embodiments of the invention, the information on what functions are used and what resources are required for correct operation of the program allows setting up the operation of the security application more accurately. Further description will provide more details on the interrelation between the functional capabilities of the application and the settings of the security modules included in the security application.

To ensure reliability of the computer system's security, a security system that includes various modules installed both locally on the computer system, and on external network nodes. Network nodes in this context mean computers, servers and other network equipment that ensures communication between computers and servers. Optimization of the operation of a security system for joint operation with the application involves a fine setup of all composite modules.

The term module as used herein means a real-world device, component, or arrangement of components implemented using hardware, such as by an application specific integrated circuit (ASIC) or field-programmable gate array (FPGA), for example, or as a combination of hardware and software, such as by a microprocessor system and a set of program instructions that adapt the module to implement the particular functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor(s) of one or more computers that execute an operating system, system programs, and application programs, while also implementing the module using multitasking, multithreading, distributed (e.g., cloud) processing where appropriate, or other such techniques. Accordingly, each module can be realized in a variety of suitable configurations, and should generally not be limited to any particular implementation exemplified herein, unless such limitations are expressly called out.

The various tools of the security application, depending on their specialization, are designed for checking files for malicious objects, network traffic filtration, analysis of program processes, filtration of mail messages, protection against unauthorized access, prevention of intrusions, detection of anomalies in the network, etc. This variety of the protection tools being deployed is largely a reaction to the constant growth of malicious programs, attacks on corporate computer networks and the emergence of new types of threats directed at new network resources. Colloquially, the various tools of security applications are referred to collectively as an antivirus. Accordingly, the term antivirus as used herein is intended to refer primarily to the detection and removal of malware, but also is intended to refer more broadly to other security tools, if not inconsistent with the immediate context.

As an illustrative example, we will discuss below the configuration of a security application installed on the same computer system as where the application is executed. In should be noted, however, that in other embodiments, the application's functionality can also influence the optimization of the operation parameters of a security tool installed on another network node, i.e., distinct, or remotely located, from the one where the application is being executed.

The protection of the computer system is intended to counter known and new threats, network attacks, fraud, spam and undesirable information. Each type of threat is processed by a separate security module. According to certain embodiments the security modules can be turned on and off independently of one another, and their operation can be configured in customizable fashion. In addition to the constant protection ensured by the security modules, periodic follow-on computer system checking tasks are created to exclude the possibility of the spread of the malicious programs not detected at the first initial of the check.

Real-time (or near-real-time) protection of the computer system is performed by such security modules as:
  a file antivirus, which checks all files being opened, saved and launched on the computer system and on all connected drives;
  a mail antivirus, which checks the incoming and outgoing mail messages;
  a web antivirus, which monitors the execution of scripts on web sites, monitors the web traffic and blocks access to dangerous web sites;
  an instant message (IM) antivirus, which ensures secure exchange of instant messages;
  a proactive protection module, which allows to prevent the execution of a malicious operation, based on the monitoring and analysis of the behavior of all programs installed on the computer system.
  an application monitoring module, which regulates the activity of programs, including controlling the access of applications to various resources;
  a firewall, which ensures secure work on local networks and the Internet, filtering the network traffic and blocking abnormal activity;
  an anti-spam tool, which checks all incoming mail messages for spam;
Protection of information means preservation of integrity, confidentiality and accessibility of data, and is ensured by the following security application functions:
  backup copying, which allows to create backup copies of data in a special storage area and to restore data in case of their loss;
  data encryption, which ensures additional protection of confidential data by placing the data in encrypted containers or performing complete encryption of disks;
  a password manager, which stores internet, program and database account passwords in a special protected area.

A parental control module allows to set flexible access restrictions for internet resources and programs, as well as to keep the accountability of the user activity on the computer system.

A control center is used in the cases when the user is working on a home network from multiple computer systems and is necessary to ensure equally high level of security for each network device. The control and synchronization modules update the security application databases and components, control the check tasks and security incidents, accumulate reports on the operation of security application services and ensure their remote control.

Each of the above security application modules has certain settings which can be changed. In addition to the fact that a module can be turned on or off, there is also a possibility to change its operational parameters. Most detection tools are based on rules built on absolute and fuzzy comparison. Therefore, the setup of the modules includes at least a modification of the signature lists of malicious objects and threats and/or a modification of threshold values for analyzers. A more fine tuning, including changing detection algorithms, is done by updating security application modules.

Generally, each security application module analyzes a certain type of object; therefore, an update of signatures of the objects of the relevant class will represent a setup of one or several security application modules.

It is possible to distinguish several main types of objects processed by analyzers in order to detect a malicious functionality or threat—a resource address, a network packet, a file, a message (email), a device, a program process (stream, operation). Each of these types can be characterized by a set of parameters.

For a file, such parameters are: the name, the size, the hash sum, the digital signature, the path to the file on the disc, the platform for opening or launch of the file, etc. The set of parameters allows to identify the required file with a high probability. To identify the file being executed, heuristic analyzers are also used, which are based on behavioral signatures. Behavioral signatures can vary; for example, they can be source code lines, program execution traces or call graphs.

A network packet is characterized by the data transfer protocol, the content of headers and the packet body (data field content). A third type of objects, the resource address, which indicates the location of a malicious or undesirable object, is set by the mail address, network address, domain name, host name, physical address, network port, etc. It is also worth distinguishing such type as the account utilized by the user. This can be useful for restricting rights for the user.

An electronic message means an email, a message through ICQ, Skype, Messenger and other instant messaging services. Such objects are investigated for spam using lexical and graphical signatures and filtered by mail addresses of the senders (recipients).

Another type of object which can be an entry in a blacklist or whitelist is a device. A device, in this context, means an external memory, an input/output device, or multimedia devices—for example, a player or a photo camera. They can be identified by serial number, manufacturer and model.

According to one type of embodiment, the monitoring of applications is based on the monitoring and analysis of the history of operations performed by an application. Even though this protection method is a heuristic detection method and not a signature-based one, the rules used in assessing the safety of an application are applied to the application's operations and resources. Therefore, it is worth distinguishing yet another type of object processed by a security application component—program processes. This type means separate operations or sets of operations, which constitute one or multiple computer system events, for example, a call for an operating system function, direct call for a device, memory reading and other actions.

The above classification of the objects stored in whitelists and blacklists of an antivirus database is only an example and does not limit the list of the objects stored in the database.

When the application is running, the security application, depending on the scenarios of the application's execution, will process various above-mentioned types of objects.

Embodiments of this invention allow the security application module to reduce the number of actions it performs to test the operation of the application, in case if the application was identified as a trusted one. In this case, a complete deactivation of security modules when running a trusted application can result in infection, loss of data and other damages to a user or company, so the setup should preferably be performed upon investigation of the application and should preferably be adapted for the application's execution scenario. Solving this non-trivial task can ensure efficient protection of the computer system and of the information processed on the computer system, while reducing the number of consumed computing resources.

In one approach, a number of criteria are defined for determining the degree of trust of an application; the application must meet each of these criteria or some defined portion of them. According to various embodiments, the following factors are example application safety criteria: existence of a digital signature; reputation of the object's rights holder; statistics of the use of the object gathered from multiple computer systems; absence of signs of known malicious or undesirable objects; the current version of the application does not contain critical vulnerabilities; the application has been tested in an antivirus laboratory. This list of criteria is provided as an example and is not exhaustive.

A user or administrator can edit a list of trusted applications, adding or deleting applications from it, as well as change the criteria of automatic inclusion of the application in the list of trusted applications. An example of a rule set by a user or administrator can look as follows: "Add all programs made by Microsoft to the list of trusted applications", or "Delete all programs without a digital signature from the list of trusted applications".

Another embodiment of the invention is directed to setting up a security application to ensure safe running of critically important applications. Such applications can include: client programs for conduct of financial transactions; programs processing confidential information or poorly protected programs. In this case, an application can be trusted but requires constant monitoring. If all security application modules are simultaneously activated at the maximum security level (if the maximum check depth is set), the load on the processor and memory will increase so much that this will sometimes impede the performance of user tasks. In this case, some part of the security application functionality, depending on current application execution scenarios, will not make a useful contribution to the increase of the security level for the computer system and the data to be processed. Ensuring an efficient security level with minimal consumption of computing resources for critically important applications is a second task solved by this invention.

FIG. 1 is a diagram illustrating a system for analyzing the impact of a general application on a security application. The illustrated embodiment involves the execution of the application 120 in a real or emulated computer system, but this example is not meant to exclude other approaches of the essential concept of analyzing the impact of an application on a security tool in a static mode, for example, using disassembling and semantic analysis.

By interacting with the Application 120 through the interface 121 or by making direct changes to the application code 120, the user 100 and the administrator can control the application: perform setup, call application functions, install and update application components, etc. The actions of the User 100 can be artificially reproduced using the simulator 110. During the execution, the application interacts with: the file system 191 (reads, writes, creates and deletes files); the network interfaces 193 (they receive and send data on the network); input/output devices (they process data entered from a keyboard or manipulators); the OS services 192, and with other software and hardware components of a computer. The interaction between the application and the components is performed through the API functions of the operating system 125. It is the accessed API functions that define the functionality implemented in the application and are used by the security application to analyze the safety of the application and of the processed data.

Most antivirus modules of security applications intercept the calls for the operating system functions, implementing their own specialized call handler 131. This can be realized by various methods: installation of a driver, modification of the operating system kernel, and by other known methods. In this case, the security application can process a limited set of function calls, which includes critical functions used by offenders to perform malicious actions. The diagram shows a recorder 141, which is also designed for tracking the sequence of the actions performed by the application, but is not limited by a specific list of operations and records all the actions performed by the application. In other embodiments, the security application specialized call handler 131 and the recorder 141 are realized in a single module.

Upon receiving, from the specialized call handler 131, information on an intercepted call for an API function, the security application 130 checks the action itself and the objects which this action accesses. For example, the application performs an operation with a file, then the security application checks the application's and user's access to the file, the possibility of the file to be read and modified by the application, the presence of malicious or potentially dangerous objects in the file. In the process of running the Security application 130 and the application, logs are kept of the security application and application operations. The logs 150, 151 are synchronized so that the application operations and the security application operations are linked by a cause-and-effect relation. This means that each action by the security application can be correlated with an action or a set of actions by the application, which were the reason for the antivirus check. The keeping of the logs 150, 151 allows to determine the reverse interrelation, in order to determine what actions with the application will trigger the security application, and, more specifically, will trigger a certain antivirus module.

For trusted applications, the operation of the security application can be optimized by adding the resources used by the application to the list of trusted objects, which will be excluded from the check tasks. The possible simplifications in the security application operation during the assurance of the safety of an application can be made using expert rules, which are updated by information security specialists. In this regard, it is important to note that a special setup of the security application does not just exclude trusted objects from the checks, but sets up the security modules depending on the type of the object and on the functional load (some components exclude the check, others increase it, for the rest, the check depth is specified).

As it was noted earlier, the setup of the security application modules is not limited by the update of signature bases. Operation rules for separate modules can also be adjusted. A significant contribution to the optimization of the security application operation can be made by changing the rules and parameters of application monitoring tools. For example, the technology based on the assessment of the reputation rating of a program process has a large number of adjustable parameters and is used in many modern security applications in various embodiments. A more detailed description of the technology is provided in the publication of utility model patent RU101233, filed Jan. 10, 2011, the content of which is incorporated by reference herein.

The use of reputation methods for detection of threats allows to divide programs not only into trusted ones and malicious ones, but also to determine potentially dangerous programs, to which limitations can be applied depending on the rating value, which is generally expressed in relative values and constitutes from 0 to 100 percent. The rating has two components: a static one and a dynamic one. Before the launch of a file, the application monitoring module analyzes the following parameters: file name, file size, file location, compression parameters, file sources. These criteria define the file's static rating. Therefore, the use of this certain features of the invention will allow to completely exclude or substantially reduce the process of calculating the static component of the rating for a trusted application.

During the execution of an application (on a host or in an emulator), the second component of the rating, the dynamic one, is calculated. For this purpose, the application monitoring module tracks the actions of programs and assesses the risk of danger for each of them against preset assessment criteria. For trusted applications, the use of the described invention can include changing the assessment criteria, for example, in reducing the amount of the risk given to each fixed action or a set of application actions. An attempt to write and read the memory of another process, creation of executable files, an attempt to modify system files and system registry, processing of confidential information, deletion of files outside of the application's folder, registration of driver and service, and many other actions, suspicious from the computer security point of view, increase the dynamic component of the rating. In this case, for a trusted application, the use of the described fine tuning technology will allow to reduce the number of checks by excluding some operations from the rating assessment factors. Having obtained the total rating, the security application restricts the processes whose rating is too high (i.e. potentially dangerous ones).

In one embodiment, to restrict the use of resources, an intrusion prevention system (IPS) is used. An IPS is a system for prevention of intrusions, combining the functionality of proactive protection and firewall, which controls permissions for the access to the file, registry, system rights, etc. For dangerous processes, it is possible to forbid the use of the network and Internet access, restrict memory use, etc. Each rating setting rule has its own parameters, such as: identifier, API function, conditions for arguments (which set a range of values for a specific danger level as a percentage), assessment in percentages by the number of operations (1, 2-3, over 3 operations), decision on the possibility to consider the process to be malicious based on this rule. Fine tuning of the security application for a trusted application can specify a list of rule identifiers, based on which of the application's operation will be monitored and restrictions will be applied; it can also change rule parameters, for example, specify that none of the rules can rate the file as malicious.

Below we will provide examples of fine tuning of a security application for various types of applications, with which the security application most often comes in conflict due to application functions close to abnormal or malicious ones.

For network utilities, such as network scanners, a security application often reports false activation errors, because applications of this type perform actions similar to malicious programs, which gather information on network configuration, perform search for vulnerabilities for infection and exploitation of computers. During the operation of such applications, it is necessary to turn off the module of protection against network attacks and the check of the traffic by a web antivirus.

A peculiarity of distributed file exchange applications (Torrent clients) consists in the generation of a large volume of incoming and outgoing network traffic and in active reading and writing of files from a disc and to a disc, respectively. Therefore, optimization of an antivirus which checks the operation of a torrent client must exclude the check of temporary and loadable files. For each computer system, the application parameters, such as the location folder on the disc, application configuration file, the version and other parameters, can vary. It is possible to automate the gathering of information on a specific application and to adapt the setup, for example, using a scenario (script). The scenario first performs a search for registry keys, folders and files, reads the data required to perform the setup, and then, based on the gathered information, uses the antivirus setup, taking into account the specifics of the computer system. To adapt the security application for the functionality and for the setup of the distributed file exchange application, the script performs the following actions:

determines whether the application is launched;
scans the application folders to search for configuration files;
identifies the folders for temporary files and loadable files, upon which the folders are added to the list of exceptions during the scanning of files by the antivirus when accessed;
identifies the connection ports opened by the application and adds exceptions to the firewall;
sets the maximum level (depth) of the check of the loaded files when the files are opened by another application.

The possibility to adapt the setup in automatic mode is not the only positive effect of using auto setup scenarios. Periodic launch of scripts allows to detect changes in the configuration of applications, for example, in case of changes in the folders with stored files or in the application version, and to use pertinent settings for the security tool.

Another illustrative example of the use of fine tuning scenarios is the configuration of a security application on a database server for protection against network attacks and unauthorized access. In order to build an efficient and resource-saving protection, it is necessary to determine the following: main services for the database operation, open ports, and network addresses available for connection. Let us discuss an example of security application configuration for work with an Oracle database server.

On an Oracle database server, several service components are generally installed. It is possible to determine the list of installed Oracle components by analyzing the registry key HKEY_LOCAL_MACHINE\SOFTWARE\Oracle. This key also contains information on the paths to the server's root folders that store the configuration files listener.ora and tnsnames.ora. The former file stores the connections setup parameters (what ports and on which interfaces the server monitors), the latter stores the setup parameters for the client (client connection parameters).

The information obtained from the registry key and configuration files is used to set up the security application modules responsible for monitoring applications and web antivirus (traffic filtration). In this case, filtration of connections can be set up so that the tuned connections would go through without a check, while all the others will be blocked by the web antivirus by default.

Figure 2:
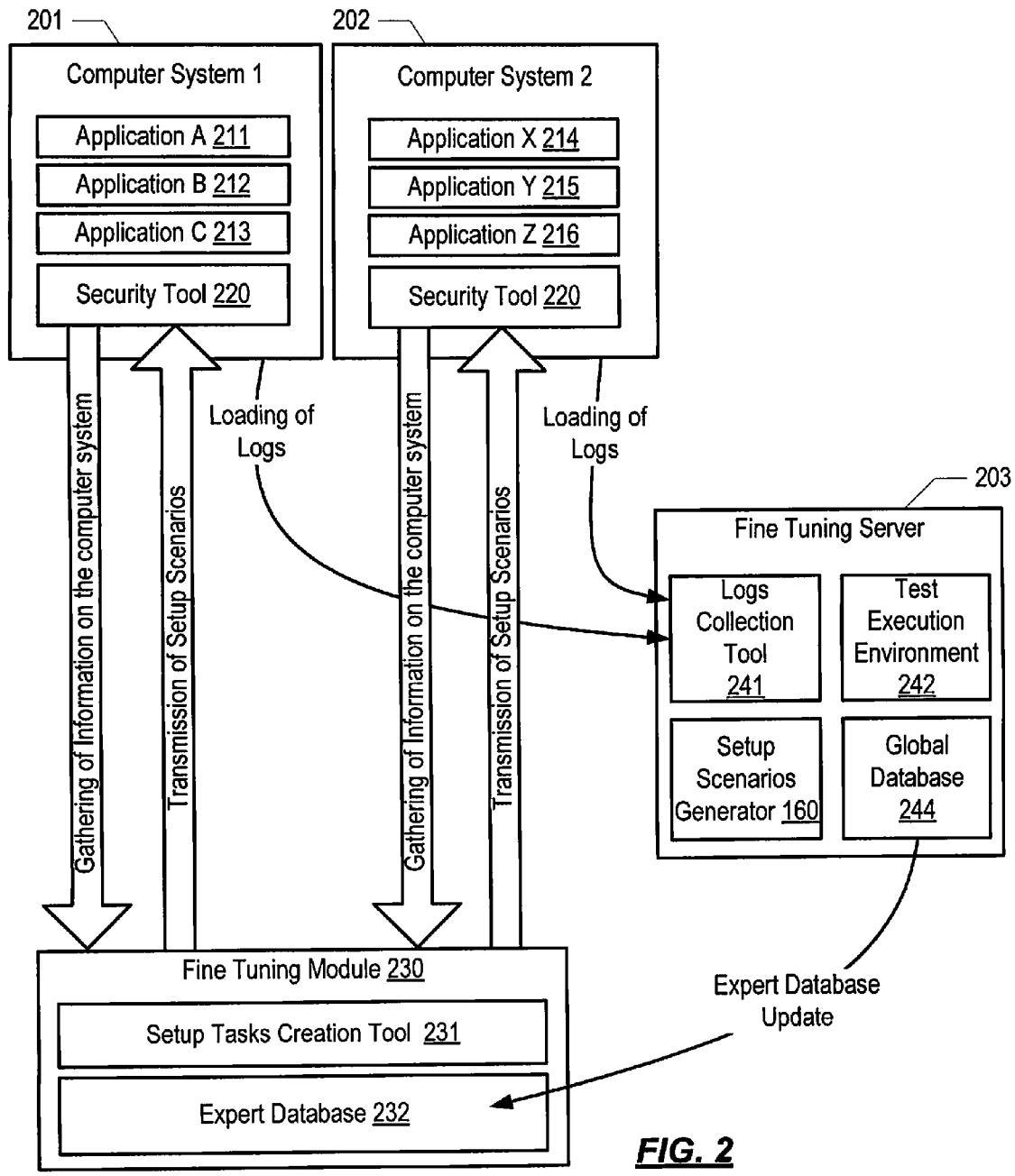
FIG. 2 is a diagram illustrating a system according to one embodiment for automatic configuration of a security application.

FIG. 2 is a diagram illustrating a system according to one embodiment for automatic configuration of a security application. In this example, the system can operate over a network, incorporating computer systems 201, 202 and connected to a fine tuning server 203. On the computer systems 201, 202, the applications 211-216 and security tools 220 are installed. In this case, the applications installed on different computer systems can differ at least in versions or settings. Computer system 1 201 has applications A 211, B 212, and C 213 installed, while computer system 2 202 has applications X 214, Y 215, and Z 216 installed. If the same security policy, which includes a setup of security application modules, is used on each computer system, the resulting security level for two computer systems with different applications installed will differ, all other factors (hardware configuration) being the same. The differences between the computing resources of the computer systems may be also taken into account when choosing the security policy.

A security tool setup which is optimal from the resource consumption point of view but efficient from the security point of view is performed by fine tuning module 230. This module can be implemented as a separate server, be a part of an administration server, or be installed on each computer system. The fine tuning module gathers information on the computer system, and then it performs a search for required setup scenarios in the expert database 232, creates a relevant task for changing the configuration of the computer system and/or security tool 220 (e.g., antivirus) using the setup task creation tool 231. When the task starts to run, the setup scenario is executed or sent for execution to the computer system, depending on whether the fine tuning module is installed on the computer system or on a remote server, respectively.

The expert database 232, used locally within a network or separate devices, stores expert data, such as: setup scenarios, rules used to choose the required scenario, and other supplementary data required for the setup of the computer system and of the security application. Only the necessary information from the global database 244, supported by the fine tuning server 203, is selectively loaded into the database 232. The selection of the loaded data depends on the programs used on the network or computer, the geographical location and the supported security tools versions.

Expert data are built on the fine tuning server 203. The expert assessment of an application is performed taking into account the statistical information and system logs, loaded into the log gathering tool 241. Another option of application analysis is to study the compatibility between the application and the security application in a test execution environment 242, provided, for example, using a simulator 110. The use of various methods for analysis of the compatibility between the application and the security application, in combination, allows to determine the entire functionality of the application, to identify the application functions which trigger the security application, and to adapt the security tool for the specific type of applications or for each specific application (application version).

The results of log processing and of the execution of the application in a test execution environment are used to update the antivirus database with signatures of white (safe) and black (malicious) objects, and for fine tuning of trusted and critical applications.

The scenarios (sets of setup instructions), examples of which are described above, are created by a setup scenario generator 160. The scenarios can be used on computers of various configuration. The input parameters for a scenario are: random access memory size, processor capacity, application version, location of the application on the disc, security tool model (antivirus version), current setup parameters of the security tool.

Having identified the relevant parameters for the computer system on which the automatic setup is being performed, the scenario updates the lists of white and black objects (which are processed by that version of the security application), and sets the security application module's controls to the values corresponding to the input parameters. For example, for a high-performance computer and for an application with a function for loading files from remote sources, the file check depth will be set at maximum, while for a computer with a small RAM size and a trusted application with a function for playing media files from a remote resource, filtration of traffic from verified network addresses can be disabled. The resulting setup scenarios and their metadata are entered in the global database, from where they are loaded into expert databases. The scenario metadata include the following: the identifier; the application or type of applications for which the scenario performs the setup; the platform for which the script is written; the scenario issue time; the scenario application efficiency indicators; a description of the performed modifications and other information characterizing the scenario.

Figure 3:
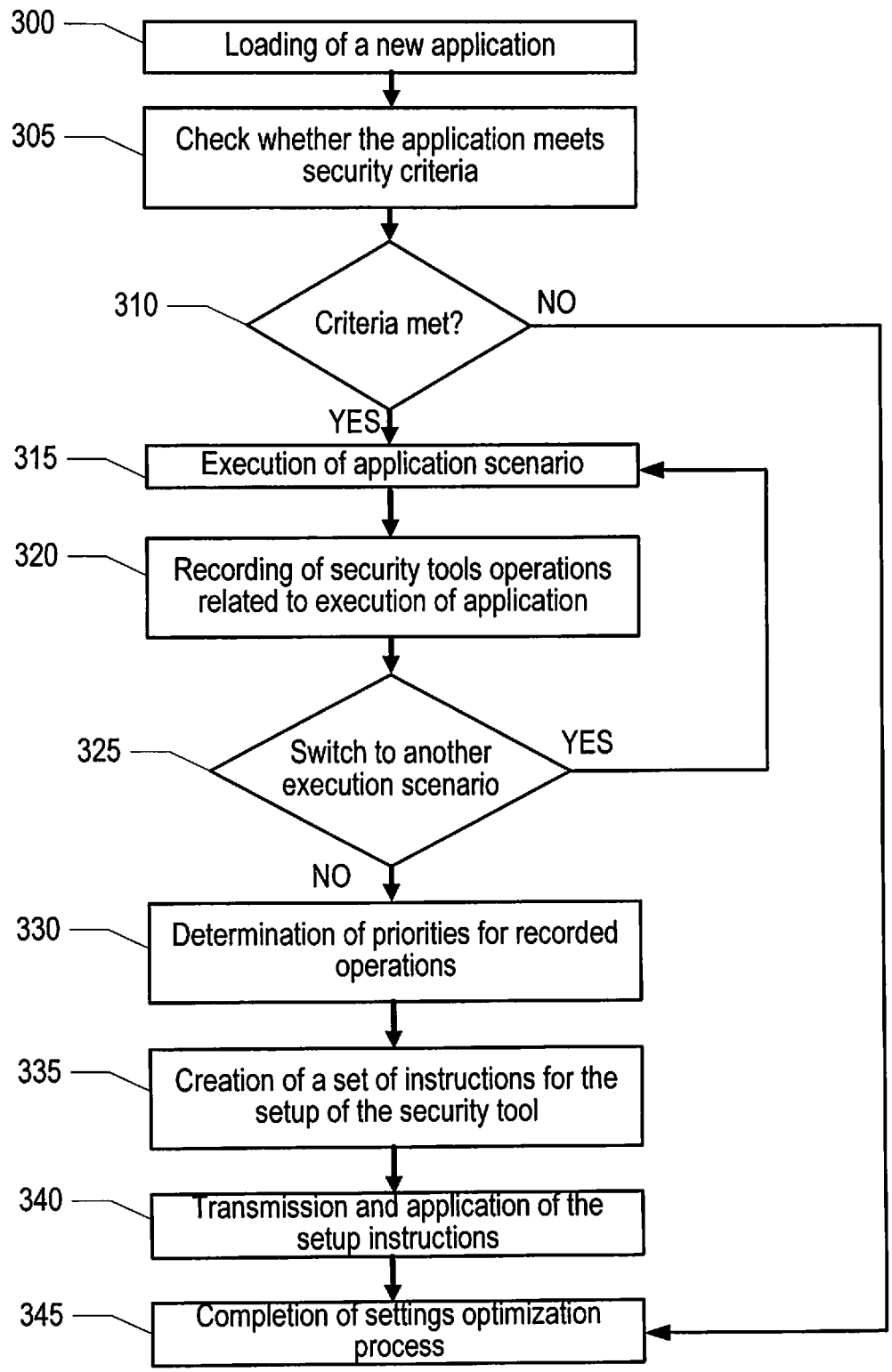
FIG. 3 is a flow diagram illustrating a method for automatic setup of a security tool according to one embodiment.

FIG. 3 is a flow diagram illustrating a method for automatic setup of a security tool according to one embodiment. The process begins when a new unknown application is detected, for example, when an application is downloaded to the computer system 300. It is also possible to initiate the start of the method by scanning the data storage for programs, by an announcement of the issue of a new application by the software manufacturer, or by a manual launch. After that, the application is checked for compliance with the security criteria 305 in order to determine whether the application is trusted. In case of non-compliance of the application with the security criteria, it is considered to be malicious. The settings optimization process is ended 345. If the application passes the check and is considered trusted, at 310, this begins the process of investigating the pertinence of the various settings of the security application to the application. During the execution of the application scenario 315, the operations of the security tool related to the operation or set of operations performed by the application are registered. During this process, an execution application log is kept. Once the application scenario is completed, the investigation is performed for another execution scenario for the application at 325. The switch of execution scenarios, as it was noted earlier, is performed by changing the application settings, by launching the application's user function and by other operations.

Once the simultaneous operation of the security application and of the application are analyzed (completely or partially), priorities are determined at 330 for the registered security application operations. The operation priority represents how necessary it is to keep the operation and the corresponding security application function in order to ensure a high security level. Maximum priority corresponds to the security application operations which cannot be disabled even in case of minimum computer resource capabilities and in case of full compliance of the application with security criteria. Minimum priority of an operation means that the corresponding function practically does not make a useful contribution to the security of the computer system during the check of a trusted application's operation.

Functions consisting of operations with minimal priority are excluded from the security application functionality when checking the objects of such application, but they can be enabled again if there are sufficient computing resources for this. A priority different from the minimum and maximum values means a dependence of the operation and, accordingly, of the parameters of the corresponding security application module, on the computer system parameters that the setup scenario will subsequently identify and use as input parameters. The determination of the priority of an operation can be done: by using expert systems (use of rules of direct match of priority value and operation or operation type); by using fuzzy logic systems, where the priority value is determined by multiple factors with various weight coefficients and by other functional dependence methods.

The recorded operations and the calculated priorities corresponding to them are sent to the security settings tool at 335. The settings, in various embodiments, can be in the form of files or other data structures in various formats: a configuration file, a layout file, a set of control commands. In the proposed implementation example, the settings are a set of instructions (script, scenario). This format allows to store a large number of settings and to dynamically determine the required setup, depending on the values of the input parameters.

After the setup scenario is created at 335, it is sent first to the global database 224, then to the expert database 232, and after that, the scenario instructions are applied at 340 on the computer system. The process of optimizing the security application settings for trusted applications is ended at 345.

Figure 4:
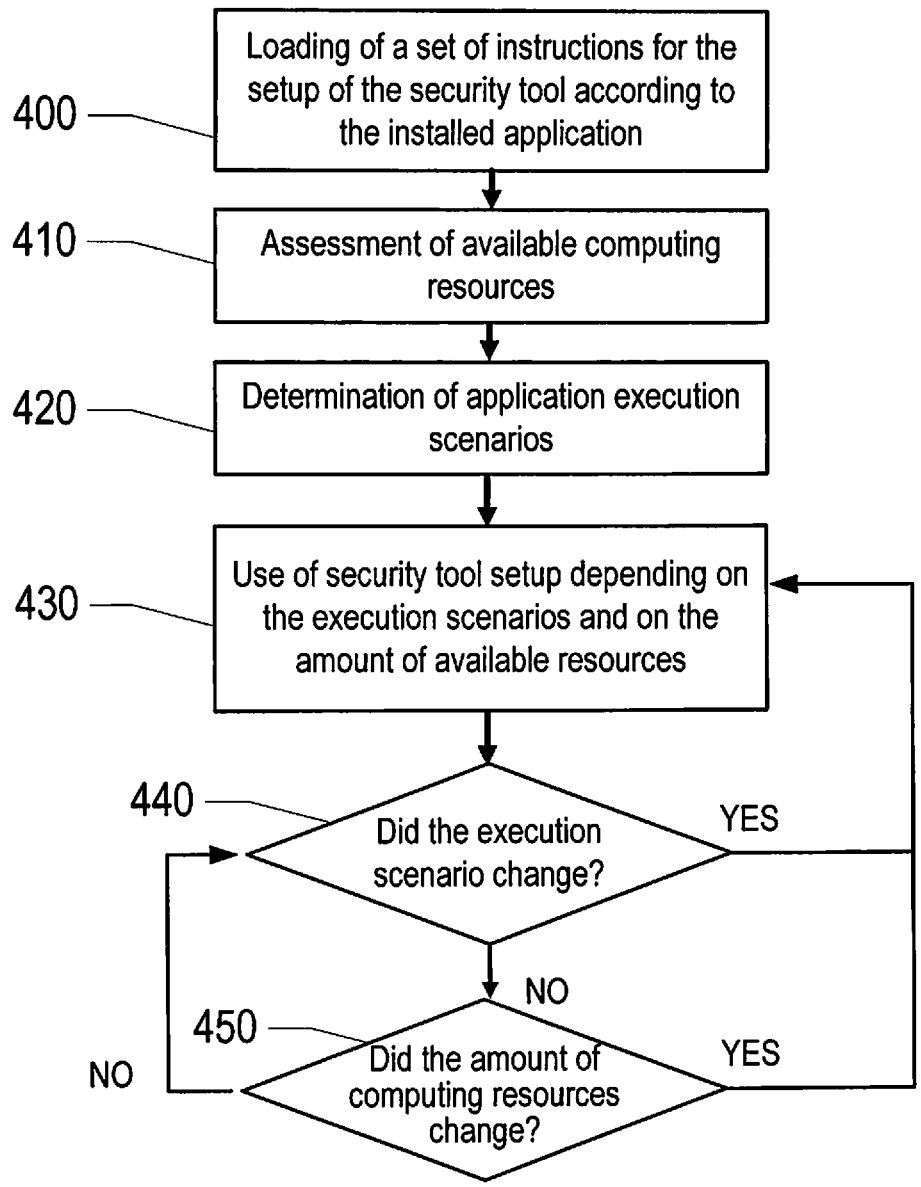
FIG. 4 is a flow diagram illustrating a process of configuring a security tool during a computer system's operation according to one type of embodiment.

FIG. 4 is a flow diagram illustrating a process of configuring a security tool during the computer system's operation according to one type of embodiment. The settings set by the user or the administrator and the security policies applied to the computer system in the existing systems may be static (do not change and are not adapted for the specific state of the computer system's operation), or have a limited set of adjustability and a long update time (in relation to the speed of computer state changes). The creation of precise (fine-granularity) settings and the use of setup scenarios according to this aspect of the invention allow the system to respond to the changes in the computer system and to change setup parameters, to thereby avoid creating a large computing load and in order to constantly maintain a high security level for the computer, data, application and network to which the computer system is connected. Once the settings required for the computer are determined, the computer is loaded with sets of instructions (scenarios) in order to configure the security tool for each trusted and critical application installed on the computer at 400. The next step is an assessment of computer system computing resources at 410, accessible within the current time interval, and determination of current application execution scenarios (setup, operation mode, user function) at 420. Blocks 410 and 420 can be performed by the setup scenario generator or by another module, such as the operating system service, which will send the information to the setup instructions in the form of an input parameter. Then, depending on the parameter values determined at the previous stages, the settings most appropriate for the current situation are applied at 430.

The application's operation mode and the load on the computer system can change independently of the security system. In case of detection of changes in the application execution scenario at 440 or in case of change in the number of computing resources at 450 accessible for the security tool, the setup scenario reviews and, if necessary, changes the security application settings in accordance with the logic incorporated in the setup scenario during its generation. In this case, the adjustment of the security tool depending on the provided attributes is shown as an example. The setup scenario can also modify the setup parameters depending on the following factors: authorized computer user, list of launched programs, geographical location of the computer, recorded outbreaks, triggering of the security tool (possibly even in relation to another application), etc.

Figure 5:
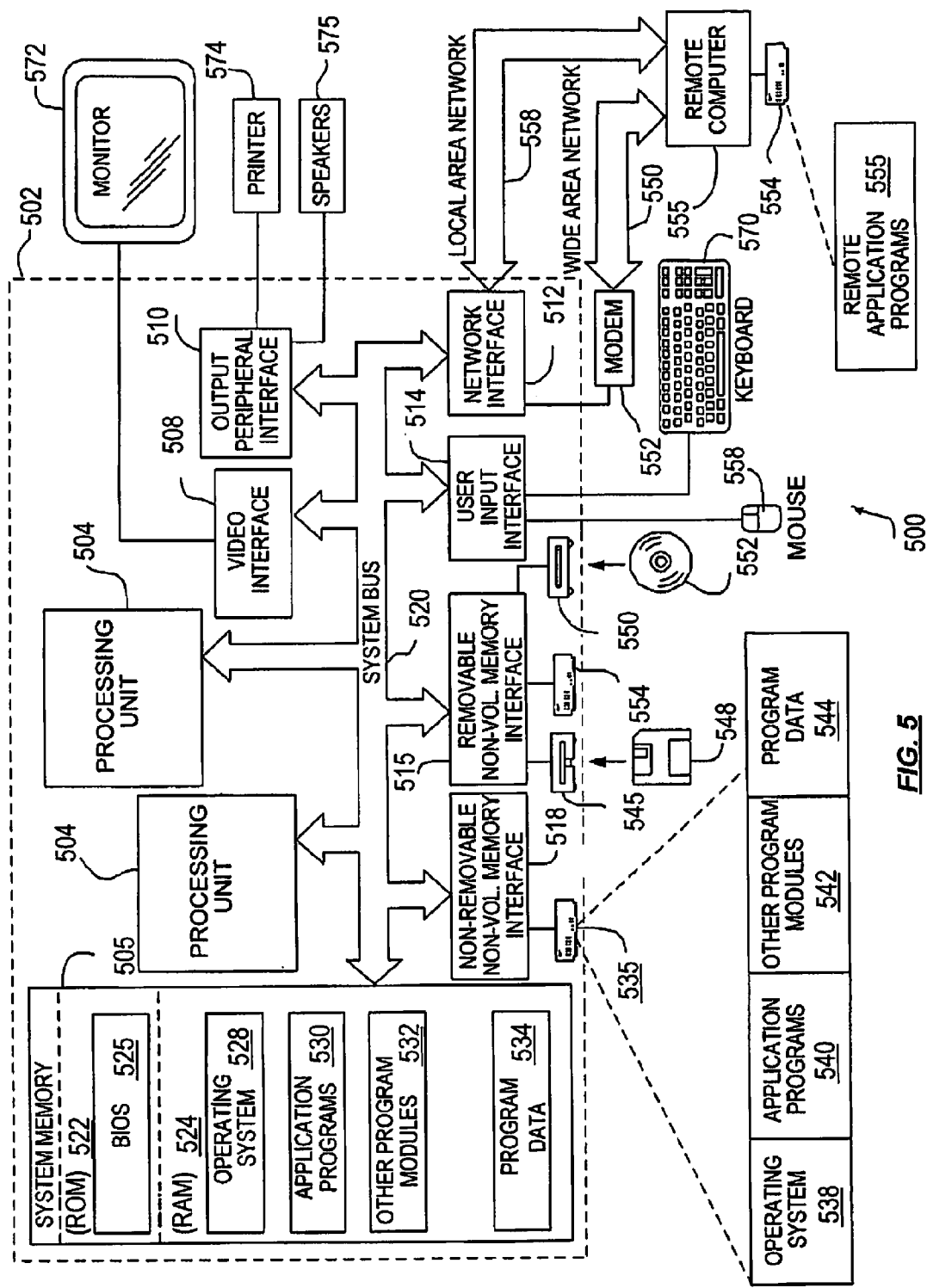
FIG. 5 is a block diagram illustrating an exemplary general-purpose computer system on which one or more functional modules according to embodiments of the invention can be implemented.

FIG. 5 is a block diagram illustrating an exemplary general-purpose computer system on which one or more functional modules of the system can be implemented. Personal computer or server 520 contains a processor 521, system memory 522 and system bus 523, which contains various system components, including memory associated with processor 521. The system bus 523 is implemented as any known in bus structure, including a bus memory, bus memory controller, peripheral bus and local bus, which can interact with any other bus architecture. System memory includes read only memory (ROM) 524, and random access memory (RAM) 525. Basic input/output system (BIOS), containing the main procedures that ensure the transfer of information between the elements of the personal computer 520, for example, at boot time using the ROM 524.

The personal computer 520 contains a hard drive 527 for reading and writing, magnetic disk drive 528 for reading and writing to removable magnetic disk 529 and an optical drive 530 for reading and writing to removable optical disk 531, such as CD-ROM, DVD-ROM or other optical media. The hard disk drive 527, magnetic disk drive 528, optical drive 530 are all connected to the system bus 523 via the hard disk interface 532, magnetic disk drive interface 533 and an optical drive interface 534, respectively. Drives and the corresponding computer storage media are non-transitory, and non-volatile storage means of computer instructions, data structures, program modules and other data of a personal computer 520. This description reveals the implementation of a system, which uses a hard disk, removable magnetic disk 529 and a removable optical disk 531, but it should be understood that the use of other types of computer storage media that can store data in computer readable form (solid state disks, cassette tape, flash drive or other nonvolatile memory, digital disks, Bernoulli cartridges, random-access memory (RAM), read-only memories (ROM), etc.) is possible.

Some of the software modules, amongst which may be an operating system 535, are stored on a hard disk, magnetic disk 529, optical disk 531, ROM 524 or RAM 525. A computer 520 has a file system 536, which stores the operating system 535 and additional software applications 537, other program modules 538 and program data 539. The user has the ability to enter commands and information into a personal computer 520 through input devices (keyboard 540, Mouse 542). Other input devices may be (not shown): microphone, joystick, game console, satellite dish, scanner, etc. Such an input device are usually connected to the processor 521 through a serial port 546, which in turn is connected to the system bus, but may be connected by other means, such as a parallel port, game port or universal serial bus (USB). A monitor 547 or other type of display device is also connected to the system bus 523 via an interface such as a video adapter 548. In addition to the monitor 547, personal computer can be equipped with other peripheral output devices (not shown), such as speakers and printer, etc.

Personal computer 520 generally operates in a networked environment, using a logical connection to one or more remote computers 549. A remote computer (or computers) 549 is/are the same as personal computers, servers, routers, network stations, peering devices or another network host, and usually, have most or all of the elements previously described in the description of the substance of a personal computer 520, shown in FIG. 5, but only as a storage device 550 with applications 537. Logical connections include a local area network (LAN) 551 and wide area network (WAN)

552, such networks are common office equipment, and are also used in corporate computer networks, company intranets and the Internet.

When using LAN networks, a personal computer 520 is connected to LAN 551 via a network adapter or interface 553. When using the WAN networking, personal computer 520 has a modem 554 or other means of communication with the global computer network 552, such as the Internet. A modem 554, which may be internal or external, is connected to the system bus 523 via a serial port 546. In a networked environment software modules of exposed personal computers 520, or parts of such programs, are stored in remote storage devices. It should be pointed out that the network connections are merely illustrative and are not required to display the exact network configuration, network, i.e., in fact, there are other ways of establishing a logical connection, other technical means of communication of one computer to another.

It should be noted that aspects of the invention may be implemented using a computer system that is a subset of the general-purpose computer system described above. For instance, the computer system may be a blade server having a relatively limited set of input/output facilities. The computer system may also be implemented as an embedded system operating on a microcontroller digital signal processor, application-specific integrated circuit, field programmable gate array, or the like, provided that the system includes sufficient input/output facilities to enable it to interface with a subject computer system being managed or with other computing devices.

The embodiments above are intended to be illustrative and not limiting. Additional embodiments are within the claims. In addition, although aspects of the present invention have been described with reference to particular embodiments, those skilled in the art will recognize that changes can be made in form and detail without departing from the spirit and scope of the invention, as defined by the claims.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as understood by persons of ordinary skill in the art.

Any incorporation by reference of documents above is limited such that no subject matter is incorporated that is contrary to the explicit disclosure herein. Any incorporation by reference of documents above is further limited such that no claims that are included in the documents are incorporated by reference into the claims of the present Application. The claims of any of the documents are, however, incorporated as part of the disclosure herein, unless specifically excluded. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. In a computing device comprising a plurality of computing resources including computing hardware and an operating system executing on the computing hardware, and a plurality of applications interfaced with the computing resources, a method for rapid automatic re-adjustment of a security application to various application execution scenarios, the method comprising:

storing a plurality of application execution scenario definitions for each of the plurality of applications, each application execution scenario definition representing a specific subset of functionality of a corresponding application, the specific subset of functionality being defined by corresponding operational settings of that application that cause specific operations to be performed in the computing device utilizing specific combinations of the computing resources;

storing a plurality of sets of security application configuration instructions, each set of security application configuration instructions corresponding to at least one of the application execution scenario definitions;

assessing, by the computing device, a current operational situation of the computing device, and determining if the current operational situation includes an application execution scenario being executed that corresponds to any of the stored plurality of application execution scenario definitions;

in response to the determining, executing, by the computing device, a set of security application configuration instructions corresponding to each current application execution scenario being executed, such that in response to the executing of the security application configuration instructions, the security application is adjusted to perform a specific subset of security functionality that is particularized to the current at least one of the application execution scenarios.

2. The method of claim 1, wherein the security application comprises a plurality of distinct security modules, each of the security modules adapted to provide a corresponding security-related functionality based on one or more adjustable operational parameters when executed via the computing resources, wherein adjustment of the one or more adjustable operational parameters for each of the security modules controls allocation of available computing resources to that module.

3. The method of claim 1, wherein the specific subset of security functionality that is particularized to the current at least one of the application execution scenario definitions preferentially performs security functionality predetermined to be essential for compliance with an assigned security policy for the computing device, and excludes certain other security functionality predetermined to be non-essential for compliance with the security policy, resulting in conservation of computing capacity associated with the certain other security functionality that is excluded.

4. The method of claim 1, wherein storing the plurality of predefined application execution scenario definitions and storing the plurality of sets of security application configuration instructions are performed by the computing device.

5. The method of claim 1, wherein executing the set of security application configuration instructions results in configuring the security application to change its criteria for selection of computing resources that are associated with an application being executed and that are subject to antivirus evaluation.

6. The method of claim 1, wherein executing the set of security application configuration instructions results in configuring the security application to change its threshold criteria defining detection of malware.

7. The method of claim 1, wherein executing the set of security application configuration instructions results in configuring the security application to change its firewall settings.

8. The method of claim 1, wherein executing the set of security application configuration instructions results in configuring the security application to change its data encryption practices.

9. The method of claim 1, wherein executing the set of security application configuration instructions results in configuring the security application to change its application monitoring practices.

10. The method of claim 1, wherein executing the set of security application configuration instructions results in configuring the security application to change its heuristic analysis algorithm.

11. The method of claim 1, wherein executing the set of security application configuration instructions results in configuring the security application to change an algorithm for determining security risk rating of applications or associated computing resources.

12. The method of claim 1, further comprising:
assessing a current availability of computing capacity on the computing device; and
wherein the executing of the set of security application configuration instructions includes taking into account the current availability of computing capacity, wherein for a given application execution scenario being executed, a change in the current availability of the computing capacity results in a change in the outcome of the execution of the application configuration instructions.

13. The method of claim 1, further comprising:
receiving, from a remote computing device, the plurality of application execution scenario definitions.

14. The method of claim 1, further comprising:
receiving, from a remote computing device, the plurality of application execution scenario definitions, wherein each of the predefined application execution scenario definitions has been determined as a result of automated emulation of the corresponding application in a virtual computing environment that is based on a particular configuration of the computing device; and
receiving, from a remote computing device, the plurality of sets of security application configuration instructions, wherein each set of the security application configuration instructions has been generated based on automated emulation of the security application in the virtual computing environment in conjunction with the automated emulation of the corresponding application, wherein specific security operations associated with execution of the corresponding application are determined based on responsiveness of emulated execution of the security application to events created by emulated execution of the corresponding application.

15. The method of claim 1, further comprising:
storing, by the computing device, an application operations log containing events resulting from operations of each of the plurality of applications;
storing by the computing device, a security application operations log containing security operations performed by the security application;
providing the application operations log and the security application operations log to a settings generator module that determines causal associations between the security operations and the events resulting from operations of each of the plurality of applications, and determines the sets of security application configuration instructions based on the causal associations.

16. The method of claim 1, wherein the security functionality includes at least one of a blacklist and a whitelist, and wherein executing the set of security application configuration instructions results in configuring the security application to change its use of the at least one of a blacklist and whitelist.

17. A system for configuring a target computing device to automatically perform rapid automatic re-adjustment of a security application on a target computing device to various application execution scenarios, comprising:
a set of at least one computing device, including the target computing device, each one of which includes computing hardware and an operating system executing on the computing hardware, and wherein at least the target computing device further includes a plurality of applications interfaced with computing resources of the target computing device and a security application having configurable operational settings;
an application execution scenario evaluation module executable on the set of at least one computing device, the application execution scenario evaluation module configured to define application execution scenarios for each of the plurality of applications, wherein each application execution scenario definition represents a specific subset of functionality of a corresponding application, the specific subset of functionality being defined by corresponding operational settings of that application that cause specific operations to be performed in the target computing device utilizing specific combinations of the computing resources of the target computing device;
a security settings generator module executable on the set of at least one computing device and operatively coupled to the application execution scenario evaluation module, the security settings generator module configured to generate a plurality of sets of security application configuration instructions, each set of security application configuration instructions corresponding to at least one of the application execution scenario definitions and adapted to adjust the security application to perform a specific subset of security functionality that is particularized to a current at least one application execution scenario being currently executed on the target computing device.

18. The system of claim 17, wherein the security application comprises a plurality of distinct security modules, each of the security modules adapted to provide a corresponding security-related functionality based on one or more adjustable operational parameters when executed via the computing resources of the target computing device, wherein adjustment of the one or more adjustable operational parameters for each of the security modules controls allocation of available computing resources to that module.

19. The system of claim 17, wherein the set of at least one computing device further includes at least one server that is remote from the target computing device, wherein the application execution scenario evaluation module and the security settings generator module are executed on the at least one server.

20. The system of claim 17, wherein the application execution scenario evaluation module is adapted to determine security functionality that is essential for compliance with an assigned security policy for the target computing device; and
wherein the security settings generator module is configured to generate the plurality of sets of security application configuration instructions such that the specific subset of security functionality that is particularized to the current at least one of the application execution scenarios preferentially excludes certain other security functionality determined to be non-essential for compliance with the security policy, resulting in conservation of computing capacity of the target computing device associated with the certain other security functionality that is excluded.

21. The system of claim 17, wherein the security application configuration instructions are adapted to configure the security application to change its criteria for selection of computing resources that are associated with an application being executed and that are subject to antivirus evaluation.

22. The system of claim 17, wherein the security application configuration instructions are adapted to configure the security application to change its threshold criteria defining detection of malware.

23. The system of claim 17, wherein the security application configuration instructions are adapted to change its application monitoring practices.

24. The system of claim 17, wherein the security application configuration instructions include decision logic that takes into account a current availability of computing capacity on the target computing device, such that, for a given application execution scenario being currently executed, a change in the current availability of the computing capacity results in the security application configuration instructions causing a change in application configuration settings.

25. The system of claim 17, wherein the application execution scenario evaluation module includes a virtual environment that performs automated emulation of each application based on a particular configuration of the computing device; and wherein the virtual environment further performs automated emulation of the security application in conjunction with the automated emulation of the corresponding application, wherein specific security operations associated with execution of the corresponding application are determined based on responsiveness of emulated execution of the security application to events created by emulated execution of the corresponding application.

26. The system of claim 17, further comprising:
an application operations log containing events resulting from operations of each of the plurality of applications; and
a security application operations log containing security operations performed by the security application;

wherein the security settings generator module determines causal associations between the security operations and the events resulting from operations of each of the plurality of applications, and determines the sets of security application configuration instructions based on the causal associations.

27. The system of claim 17, wherein the set of at least one computing device includes a plurality of geographically-distributed computing devices including a local group and a greater plurality of computing devices, the local group including the target computing device; and wherein the system further comprises:
a global database module executable on the set of at least one computing device and operatively coupled to the security settings generator module, the global database module containing a plurality of application execution scenario definitions and corresponding sets of security application configuration criteria corresponding to a plurality of applications present on the local group, and on the greater group of computing devices;
a local setup rules database module executable on the set of at least one computing device and operably coupled to the local database module, the local setup rules database module containing a local subset of the plurality of application execution scenario definitions and corresponding sets of security application configuration criteria stored in the global database module, the local subset including only security application configuration criteria corresponding to the local group of computing devices; and
wherein the security settings generator module is configured to generate the plurality of sets of security application configuration instructions for each of the computing devices of the local group based on the local subset of the plurality of application execution scenario definitions and corresponding sets of security application configuration criteria, and on system configuration information for each of the computing devices of the local group.

28. The system of claim 17, wherein the security functionality includes at least one of a blacklist and a whitelist, and wherein the security application configuration instructions are adapted to configure the security application to change its said at least one of the blacklist and whitelist.

* * * * *